Sept. 17, 1957      E. M. S. McWHIRTER      2,806,335
DOCUMENT JACKETING AND ENCODING MACHINE
Filed March 24, 1954      4 Sheets-Sheet 1

INVENTOR
E. M. S. McWHIRTER
BY
ATTORNEY

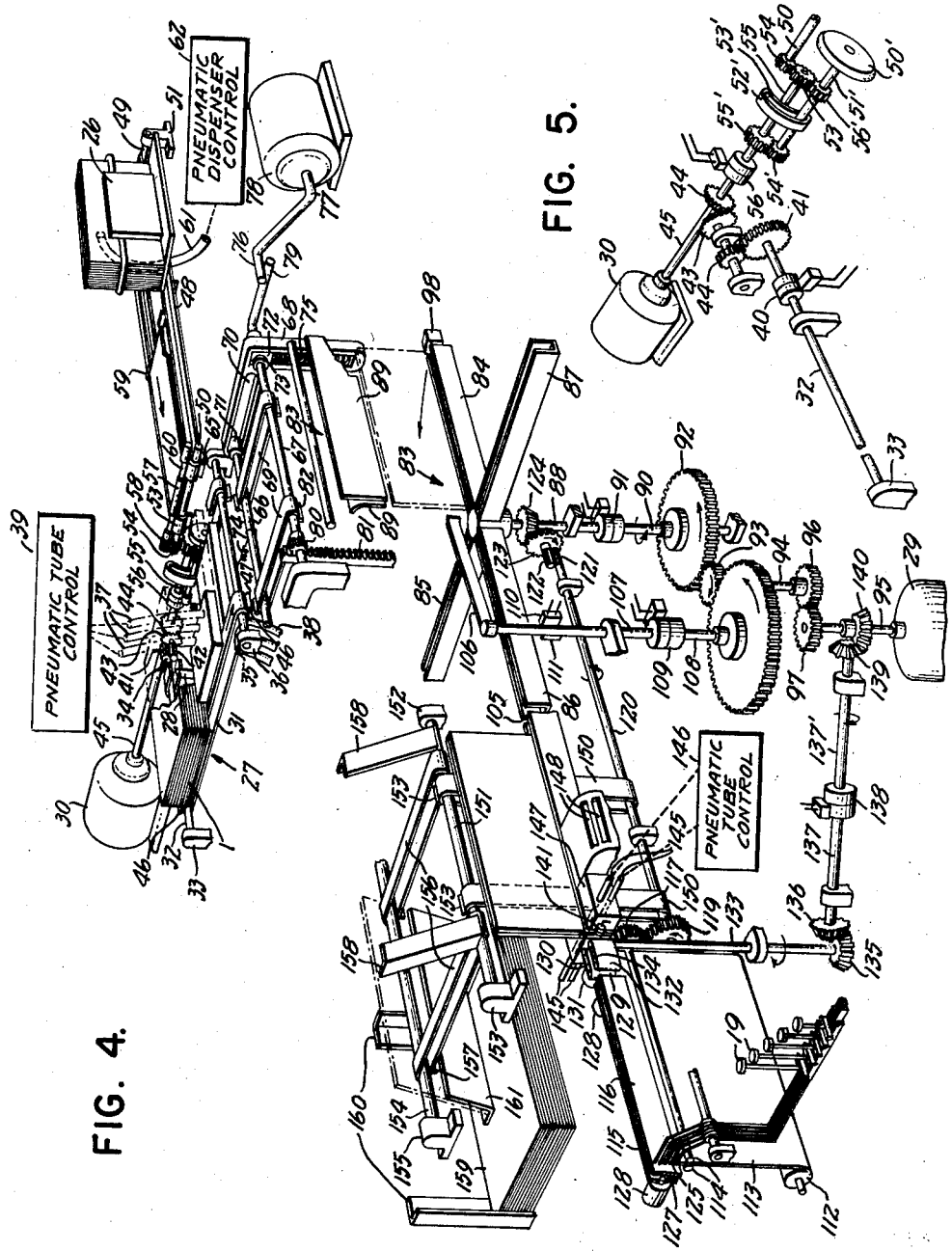

United States Patent Office 2,806,335
Patented Sept. 17, 1957

2,806,335
DOCUMENT JACKETING AND ENCODING MACHINE

Eric Malcolm Swift McWhirter, Mount Vernon, N. Y., assignor to International Standard Electric Corporation, New York, N. Y., a corporation of Delaware Application March 24, 1954, Serial No. 418,441

17 Claims. (Cl. 53—78)

This invention relates to a machine for preparing documents for automatic processing.

To process information inscribed upon documents by mechanical and electrical methods, it is necessary to provide the information in such a form that it can be read by automatic methods. Documents pertaining to ordinary commercial and industrial transactions are, in general, originated by the normal manual means of writing or typewriting, and as such, the information inscribed is not in a suitable form for automatic interpretation by the present well known methods, such a mechanical, electrical, or photoelectrical scanning.

In addition to processing of the information, it is necessary, in many cases, for the document itself to be processed, particularly where it constitutes a legal instrument, as in the case of checks drawn on bank accounts.

Thus, although methods of translating from written information into electrical impulses suitable for application to automatic processing equipment are well known, for example, in a teleprinter machine, such methods do not permit the document itself to be automatically processed.

Punched card techniques, by inscribing the information twice, once in normal written characters and secondly by holes punched in code conformation, fill the requirement and also enable the document to be intelligible to human senses as well as capable of automatic processing, both as regards the information and the document. As documents, they suffer from the disadvantages of rigid requirement as to size and are rendered unserviceable to the machine if folded or torn in the human handling stages. In addition, the necessity for the dual methods of inscribing the information on the one document constitutes a restriction upon the amount of information that can be either written or encoded.

It is one of the objects of the present invention to provide a machine which can take documents of any size, within reasonably variable dimensions, and provide them with jackets or wrappers of fixed dimensions upon which are encoded the information contained upon the document in a form suitable for automatic processing methods.

Another object of the invention is to provide a machine, as defined in the paragraph above, which will display first one side of the document to the observer and then the other side.

Another object of the invention is to provide a machine, as defined in the two paragraphs above, which permit an operator to apply the necessary information in coded form to the jacket and document assembly and then display the encoded information simultaneously with the display of the document to permit the operator to check the accuracy of the encoded information.

The above mentioned and other features and objects of this invention and the manner of attaining them will become more apparent and the invention itself will be best understood by reference to the following description of an embodiment of the invention taken in conjunction with the accompanying drawings in which:

Fig. 4 is a perspective view of the machine with portions of the frame removed and portions of the mechanism broken away or removed to illustrate the construction and operation of the various parts of the machine;

Fig. 5 is a perspective view of a portion of the mechanism;

In the embodiment of my invention hereafter described the machine comprises means responsive to the operation of a key for feeding one jacket at a time from a collection of jackets and delivering said jacket to a jacket loading position, means controlled by the jacket feeding means for feeding one document at a time from a collection of documents and inserting said documents in a jacket positioned at said loading position, first jacket moving means for moving a loaded jacket from said loading position to a first inspection position with one side of the jacket visible from the front of the apparatus, second jacket moving means, controlled by the operation of the key, for moving the jacket from the first inspection position to a second inspection position and reversing the position of the jacket, so that the other side is visible to the operator, manually operable key means for earmarking said jacket, for example by applying indicia to the jacket or to a strip of sheet material carried by the jacket to represent information appearing on the document carried by the jacket, means for automatically reading the indicia, means controlled by the reading means for displaying the indicia so read, whereby the applied information may be compared with that on said document, and third jacket moving means controlled by the first key means for moving the jacket from the second inspection position to a receptacle provided for that purpose.

The invention may be used with any form of document, such as sales tickets, credit or debit tickets, stock room cards, payroll tickets etc., but in the present disclosure, the invention has been described in connection with bank checks. These vary considerably in width, length, and thickness, but in general fall within certain broad maximum and minimum limits of dimensions.

Figure 2:
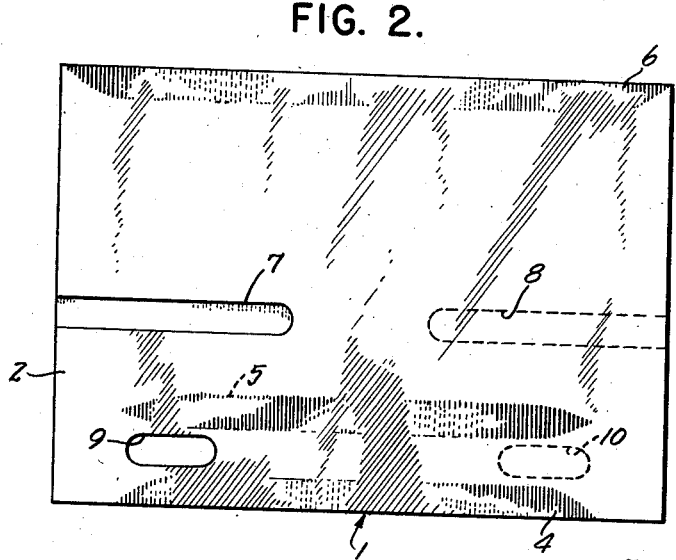
Fig. 2 is a plan view of a jacket which may be used with the invention.
Figure 3:
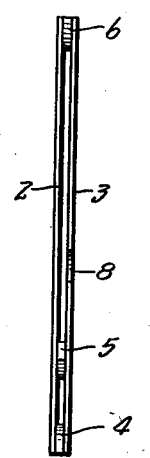
Fig. 3 is an end view of the jacket shown in Fig. 2.

The jacket 1 in which the checks are placed by the machine of the invention may be similar to those shown in my application, Serial No. 418,394, filed of even date herewith and entitled "Document Carrier for Mechanized Processing." A preferred form of this jacket is shown in Figs. 2 and 3. It consists of two rectangular sheets 2 and 3, preferably of cellulose acetate, which are held in slightly spaced relation by means of spacers 4, 5 and 6. Spacers 4 and 6 are at opposite side edges of the sheets 2 and 3, while spacer 5 is positioned a short distance from spacer 4. Spacer 6 extends the full length of the sheet and its inner ends are curved as shown. Spacer 4 is shorter than the plates 2 and 3 and its inner edge is curved at its ends. Spacer 5 is also shorter than the plates 2 and 3 and has both of its edges curved so that it comes to a point at each end.

The plates 2 and 3 and the spacers 5 and 6 define an envelope in which a check is adapted to be inserted; the spacers 4 and 5 together with the plates 2 and 3 define an envelope much narrower in width in which a paper strip may be inserted which carries the coded indicia relative to the written information on the check, which coded indicia is applied in a manner which will be explained later. The curved ends of the spacers 4, 5 and 6 permit easy access for the check and indicia strip.

At the left end of the plate 2, as viewed in Fig. 2, midway between the spacers 5 and 6, I provide a slot 7, extending from the end of the plate to a portion adjacent the center. A similar slot 8 may be provided in the right end of the other plate 3. A short slot 9 may also be provided between the spacers 4 and 5 in the plate 2, adjacent the left end thereof, and a similar slot 10 may be provided in the plate 3 at the other end thereof.

The arrangements of the slots 7, 8, 9 and 10 make the jacket symmetrical with respect to the ends thereof so that it may be turned end for end and present the same slot arrangement. The purpose of these slots will be explained hereinafter.

Referring now to Figs. 1, 4, 5 and 6, the machine comprises a frame 15 having a table portion 16, in front of which an operator may sit, and a housing 17 which encloses the various parts of the apparatus. The table 16 may be provided with a keyboard 18 having a plurality of keys 19, by means of which the operator can code the desired information, and including a "clear" key 20 and a "perforate" key 21, the purpose of which will be described later. In the housing 17, facing the operator, is a window 22 in which the reverse side of the check is displayed at a first inspection position, and somewhat to the left thereof, another window 23 in which the face of the check will be displayed at a later time in the cycle at a second inspection position.

Figure 1:
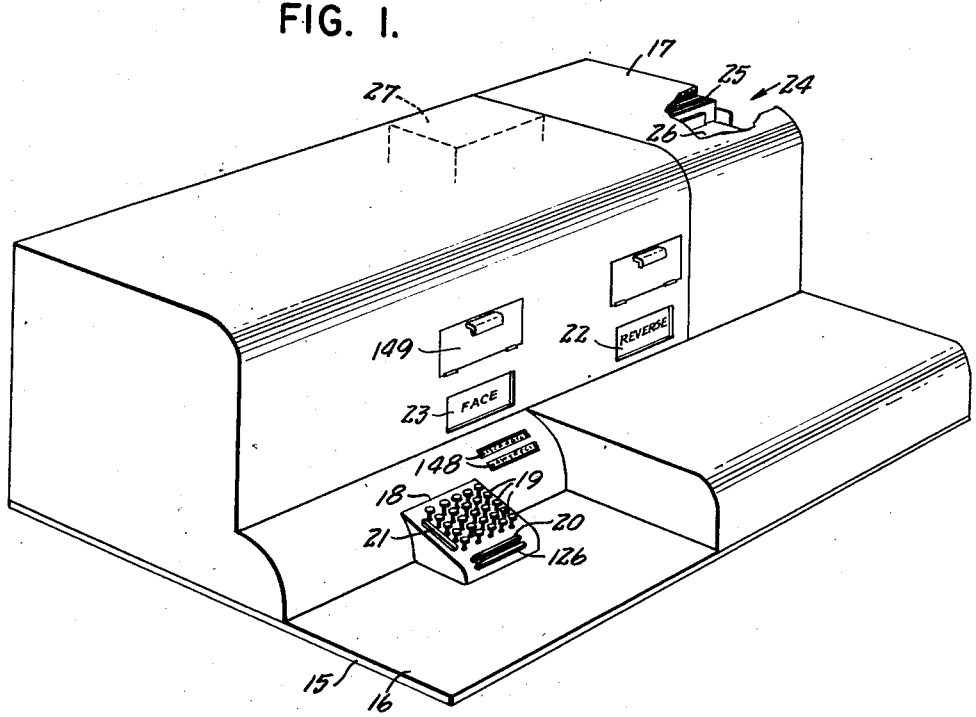
Fig. 1 is a perspective view of the outside of a machine incorporating the invention.

As the right end of the housing, as viewed in Fig. 1, a magazine or compartment 24 is provided to receive a quantity of checks, called a "block." The checks of each block may be those having some common identification, as for example, sequential account numbers. A block of checks is placed in the magazine 24 with the checks standing on edge and their faces towards the rear of the machine. The checks may be held in a compact group by tensioning devices 26 which are arranged to maintain a predetermined tension on the block, as checks are removed one by one from the rear thereof.

A magazine 27 for jackets 1 is also provided within the housing 17 at a position to the rear of the window 22 and somewhat above the upper level of the window. The jackets 1 are adapted to be stacked in the magazine 27 in the same manner that they are shown in Fig. 2 with the spacers 4 and 5 towards the front of the machine.

The jackets are adapted to be withdrawn successively from the bottom of the stack, and a guide 28 is provided forward of the stack of jackets which extends downwardly far enough to prevent all jackets except the lowermost one from being moved forward.

Power is supplied to the machine by two motors 29 and 30 which are adapted to run continuously, as long as the main switch (not shown) is turned on. Although two motors have been shown for convenience in the drawings, it will be understood that a single motor might be used to drive the several parts of the machine.

In order to move the lowermost jacket of the stack in the magazine 27, I provide a pair of endless belts 31 which are parallelly arranged and upon which the stack of jackets rests. The belts 31 are driven from a shaft 32 suitably journaled in bearings 33 at the ends thereof, the rear loops of the belts passing over this shaft. The belts are supported at the forward end of the loops by means of a shaft 35 journaled in bearings 36.

The shaft 32 is provided with a clutch 40 (shown more clearly in Fig. 5) which is positioned between the shaft 32 and a gear 41 which meshes with a gear 42 attached to a bevel gear 43 which in turn meshes with a bevel gear 44 attached to a shaft 45 driven by the motor 30. The shaft 32 and therefore the belts 31 will be driven only when the clutch 40 is operated. The clutch 40 is an electrically operated clutch and its control will be explained later.

The belts 31 are provided with cleats 46, the purpose of which is to push one of the jackets from the bottom of the stack when the belts are moved in the direction of the arrows.

A micro-switch 47 is positioned adjacent the shaft 35 where one of the belts 31 passes over it and is arranged in such a position that the cleats 46 will engage it and cause it to operate. This switch is used to stop the movement of the belts 31 in a manner to be later described.

When a jacket has moved a distance of its width forward it is in the "insertion position" where the check is to be inserted. At this time the cleat 46, immediately in front of the jacket, will have turned around the shaft 35 and will have operated the switch 47 to stop the movement of the belts 31 by opening the clutch 40. A group of several pneumatic tubes 37 are provided terminating just above the jacket in the "check insertion" position, and a cooperating group of pneumatic tubes 38 are provided just below the jacket. These pneumatic tubes are connected to a pneumatic tube control device 39 which is energized in a manner to be later described and which when energized produces a suction in the tubes to separate the sheets 2 and 3 of the jacket to assist in the insertion of the check. This pneumatic mechanism is well known in the art and need not be described in detail.

At this time the mechanism which feeds the check into the jacket commences to operate and will now be described.

Immediately to the rear of the check magazine 24 and substantially on a level with the lower edges of the checks in the block I provide a pair of belts 48 which are arranged to rotate in the direction of the arrows by means of shafts 49 and 50, journaled in bearings 51. Only one of each of these bearings for shaft 49 has been shown. The belts 48 are driven by means of a gear 53 which meshes with a gear 54 attached to the shaft 50. The gear 53 is mounted on a shaft 55 which is in alignment with the shaft 45 and is connected to that shaft by means of a clutch 56. The arrangement is such that, when the clutch 56 is operated, the shaft 45 drives the shaft 55 and therefore the shaft 50 through gears 53 and 54, and by means of shaft 50 the belts 48 are driven.

An auxiliary shaft 57 is mounted directly above the shaft 50 and is provided at its end with a gear 58 which meshes with the gear 54, so that when the shaft 50 is driven, the shaft 57 is also driven in the opposite direction. The shafts 50 and 57 therefore act as rollers which will grasp a check and drive it towards the left of the machine if a check is inserted between these two members while they are operating. In order to drive a check more efficiently the shafts 50 and 57 may be coated with rubber or other resilient material.

The belts 48 may also be provided with cleats 59 arranged at such positions on the belt as to act to push a check laid upon the moving belt towards the rollers 50 and 57. A groove 60 is provided in the upper roller 57 at the place where the belt 48 passes between the rollers so as to permit the cleat 59 to pass therebetween.

The checks are delivered one at a time to the belts 48 by well known pneumatic apparatus. Thus, a pneumatic tube 61 is mounted for arcuate movement between the belts 48 under control of a pneumatic dispenser control apparatus 62 which causes the tube to engage the face of the rearmost check and, because of suction applied to the tube, draw it face downwards upon the belts 48 as the tube swings downwardly. The control apparatus 62 is operated simultaneously with the pneumatic tube control device 39 in a manner which will be described later.

A micro-switch 65 is positioned just below the roller 50 adjacent the place where one of the belts 48 passes over it, and this micro-switch is arranged to be contacted by one of the cleats 59, so as to operate the switch. This switch is used to arrest the movement of the belts 48 by releasing the clutch 56 in a manner to be described later.

After the check has left the rollers 50 and 57, it is still not entirely within the jacket, and in order to insure complete insertion, I provide a small wheel 50' (Fig. 5) mounted on the end of a bodily movable shaft 51' which is parallel to the shaft 55. The shaft 51' is mounted in a bracket 52' which has an arcuate slot 53' having a radius of curvature equal to the distance of the shaft 51' from the shaft 55. The shaft 51' also carries gears 54' and 56' which mesh with gears 55' and 53 attached to the shaft 55.

When the shaft 55 is driven it drives the shaft 51' which thereupon moves upwardly in the slotted bracket 52' until the wheel 50' is in the slot 8 in the plate 3 of the jacket 1. The rim of the wheel 50' may be rubber coated so as to frictionally engage the check and move it entirely into the jacket after it leaves the rollers 50 and 57. After the shaft 55 has stopped, the shaft 51' returns to its normal position, either by gravity or urged by a suitable spring, not shown.

Just forward of the shaft 35 and of the insertion position of the jacket I provide a mechanism for carrying the jacket forward and turning it downward, so that it will appear vertically positioned in front of the window 22 in the first inspection position. The manner of accomplishing this will now be described.

A pair of shafts 66 and 67 are mounted parallel to each other and to the shaft 35 in a pair of brackets 68. A pair of endless belts 69 are mounted over these shafts and rotate with the shafts. The shaft 66 may be positioned slightly below the shaft 35 or slightly in front of it but has no driving connection with the shaft 35. The shaft 66 is not only rotatably mounted in the brackets 68 but is also mounted for bodily movement in a horizontal plane. To accomplish this, each of the brackets 68 is provided with a horizontal groove 70 and a bearing member 71 is positioned in each of the grooves 70 and carries one end of the shaft 66 in a freely rotatable manner. The bearings 71 can slide in the grooves 70 without interfering with the rotation of shaft 66 but permitting shaft 66 to move bodily forward and backward in the groove.

Each of the brackets 68 is also provided with a vertical groove 72 in which bearing members 73 may slide, these bearing members being the bearings for the shaft 67 and in which the shaft 67 freely rotates.

The bearing members 71 for the shaft 66 are urged toward the rear by means of springs 74, while the bearing members 73 for the shaft 67 are urged upwardly by means of compression springs 75. With this arrangement the bearings 73 for the shaft 67 may be forced downwardly against the tension of the springs 75 which will cause the shaft 66 and the supporting bearing members 71 to move forwardly in the grooves 70 against the tension of springs 74. When the force urging the bearing members 73 downwardly is removed, both shafts will return to the positions shown in the drawings.

The bearing members 73 are urged downwardly by means of a crank arm 76 attached to the shaft 77 of an auxiliary motor 78. The crank arm 76 bears against a horizontal lever 79 which is attached to one of the bearing members 73. The lever 79 does not rotate, but merely moves down as the crank arm 76 slides over it. The shaft 67 is provided with a pinion gear 80 which meshes with a rack 81 arranged vertically, so that whenever the shaft 67 is forced downwardly, it will cause the pinion 80 to rotate along the rack 81, thereby rotating the shaft 67. In this manner, when the motor 78 causes the shaft 67 to move downwardly, it will rotate and drive the belts 69. This action will cause the jacket carried by the belts 69 to tilt downwardly, so that it will eventually slide off of the belts 69 in a near vertical position. The belts 69 may also be provided with cleats 82 which act to urge a jacket forward which has been deposited upon the belts 69.

Immediately below the shaft 67 is a jacket holder 83 which is adapted to catch the jacket as it falls from the belts 69. The holder 83 comprises four channel members 84, 85, 86 and 87 mounted on a shaft 88 which is vertically supported in the frame 15. The holder 83 is arranged to be rotated intermittently under the control of the "clear" key 20 in a manner later to be described, the holder making one-quarter turn in a counter-clockwise direction each time the clear key is depressed. When at rest the holder is so positioned that one of the channel members 84 through 87 is substantially under and slightly forward of the shaft 67. A pair of baffle plates 89 are arranged just below the shaft 67, so as to guide a jacket falling from the belts 69 into the slot in whichever one of the channel members 84 to 87 that happens to be in position to receive it.

The shaft 88 is driven from a shaft 90 through a clutch member 91. The shaft 90 is in turn driven from the motor 29 by means of a gear train consisting of a gear 92 meshing with a pinion 93 attached to an auxiliary shaft 94 which is geared to the motor shaft 95 by means of gears 96 and 97, the former being attached to the shaft 94 and the latter to the shaft 95. The clutch 91 is operated in a manner to be later described and is released by means of a micro-switch 98 which is engaged by one of the channel members and causes the holder to stop in the proper position.

At the left side of the holder 83, as viewed in Fig. 4, a channel member 105 is positioned, so as to be aligned with one of the channel members 84 to 87 when the holder 83 is at rest. This channel member 105 is at the second inspection position for the jacketed document and the window 23 in the housing 17 is directly in front of it, so that the document is visible through the window when the jacket is in the channel member 105.

In order to move a jacket from one of the channel members of the holder 83 onto the channel member 105, I provide a pusher finger 106 mounted upon a shaft 107 and extending diametrically from the top of the shaft. The shaft 107 is driven from a shaft 108 through a clutch member 109 which is operated in a manner to be described and released by means of a micro-switch 110 which is engaged by a cleat 111 attached to the shaft 107 in such a position that it engages the switch in order to stop the pusher finger 106 in a position which may be substantially parallel to the adjacent channel member holder 83 and extending in the direction of the holder. When the shaft 107 is rotated in a counter-clockwise direction, the pusher finger 106 will engage a jacket resting in the channel member on the left side of the shaft 88, as seen from the front of the machine, and will push it out of the holder member onto the channel 105 still standing in an upright position.

It will be noted that when a jacket is in a channel member 105, it is standing in an upright position with a document toward the top of the jacket and the envelope formed by the spacers 4 and 5 at the bottom. While in this position the operator may apply coded indicia to the jacket representing information which appears on the face of the document. In the embodiment shown, this indicia is applied to a paper strip which is then inserted in the space between the spacers 4 and 5 of the jacket 1. This is accomplished in the following manner:

A roll of paper 112 is mounted horizontally below and to the left of the jacket in the channel member 105 and parallel to the plane thereof, the width of the paper in the roll being equal to the length of the strip of paper which is to be inserted in the jacket. The sheet of paper 113 from the roll is fed through rollers 114 which force the end of the paper sheet up between two plates 115 and 116 where it is in position for having the coded indicia applied to it. The rollers 114 are driven from the shaft 88 which supports the holder 83 by means of a gear train which includes a gear 117 mounted on the forward one of the rollers 114 which meshes with a gear 119 attached to a shaft 120 extending horizontally parallel to the plane of the jacket in the channel 105 and which has a pinion gear 121 at its other end. The pinion 121 meshes with a pinion 122 attached to a bevel gear 123 which in turn meshes with a bevel gear 124 attached to the shaft 88. When the shaft 88 rotates to rotate the holder 83 the shaft 120 is rotated and rotates the rollers 114 to roll a portion of the sheet of paper 113 upwardly between the plates 115 and 116, so that when the holder 83 has been brought to rest, the end of the sheet of paper 113 is positioned between the plates 115 and 116.

The manner in which the coded indicia representing the information on the check applied to the end of this paper sheet will now be explained.

As has already been stated, the keyboard 18 carries a plurality of keys 19. These are arranged in vertical rows, there being one row for each row of coded elements to be applied to the paper strip. Suitable paper punching elements, indicated at 125, are provided mounted on the plate 116 and are arranged to be set by the manipulation of the keys 19. The punching mechanism has not been disclosed in detail, since any well known punching mechanism may be used for this purpose. It is sufficient to state that the punching mechanism may be set by the keys before the actual punching step is performed. An error key 126 may be provided to break down the setting of the punches if an error has been detected in the setting before the actual punching takes place.

The plate 115 is stationary and has at its lower edge a knife edge 127. The plate 116 is movable towards and away from the plate 115, being controlled by two magnets 128 which when energized pull the plate 116 towards the plate 115. The lower edge of the plate 116 cooperates with the knife edge 127 to cut off a strip 129 of the paper sheet 113 which is then free to be inserted in the jacket which is then standing in the channel member 105. At the same time the movement of the plate 116 will cause the actual punching of the strip in accordance with the setting of the punching mechanism by manipulation of the keys 19.

The magnets 128 are controlled by the "perforate" key 21 in a manner later to be described. As soon as the strip 129 has been severed from the sheet 113 and the punching completed, the magnets 128 release in a manner later to be described and a plate 130 is caused to move by means of a magnet 131 to push the strip 129 against a movable belt 132 which is arranged parallel to the strip, riding over a driving shaft 133 arranged vertically parallel to the strip and an auxiliary shaft 134 arranged parallel to the shaft 133. The shaft 133 is provided at its lower end with a bevel gear 135 which meshes with a bevel gear 136 connected to a horizontal shaft 137. The shaft 137 is driven from the shaft 95 under control of a clutch 138 the driven member of which is attached to the shaft 137, while the driving member is attached to a shaft 137' terminating in a bevel gear 139 meshing with a bevel gear 140 attached to the shaft 95.

Normally, rotation of the shaft 95 does not cause rotation of the shaft 137, but when clutch 138 is operated, shaft 137 will rotate, causing the rotation of shaft 133 and the rotation of the belt 132 to cause the paper strip 129 to move towards the right of the machine, as viewed from the front.

A photoelectric cell 141 is provided at the right hand end of the paper strip 129, as viewed from the front of the machine. With the paper strip in position, light from a source (not shown) will fall upon the photoelectric cell and thus will permit the strip to be moved in a manner to be later described. If there is no paper in position, light will fall upon the photoelectric cell 141 and the clutch 138 will be prevented from operating, so that the belt 132 will not be driven.

Pneumatic tubes 145 are provided attached to the channel member 105 with their ends adjacent the portion of the jacket 1 between the spacer members 4 and 5. The purpose of these pneumatic tubes is the same as already explained in connection with the tubes 37 and 38 which separate the two plates 2 and 3 of the jacket in the check inserting position. A pneumatic tube control mechanism 146 operates to apply suction to the sides 2 and 3 of the jacket and thus to draw them apart in a known manner, so that the paper strip 129 may be forced by the moving belt 132 into the space in the jacket between the two sides 2 and 3 and between the spacers 4 and 5. A roller (not shown) similar to the roller 50' may be caused to contact the strip through the slot 9 to insure the strip moving into the proper position within the jacket after the belt 132 has ceased to engage it.

After the strip 129 is positioned in the jacket it is very desirable to provide a means for the operator to check the information she has keyed as coded indicia onto the paper strip 129 against the actual information on the face of the check in the jacket. In order to accomplish this a photoelectric read 147 is provided at the left end of the channel member 105, as viewed from in front of the machine, which reads off the information which has been punched in the paper strip as the strip is advanced into the jacket. This photoelectric read has not been disclosed in detail, since it may be any well known type of reading apparatus for reading off information punched onto a paper strip. Windows 148 may be provided in a portion of the housing 17 just below the window 23 where the face of document appears. Suitable display apparatus is incorporated in the photoelectric read mechanism 147 to display the information read off from the paper strip. The operator may then look at the face of the check appearing in the window 23 and compare it with the displayed information set up in the windows 148 in order to determine whether she has keyed up the proper information. If the information is wrong, she may remove the entire jacket by opening a door 149 immediately above the window 23. If the information is correct, she can depress the "clear" key 20 again which will cause the jacket to be removed from its position in the channel member 105.

In order to remove a jacket from the channel member 105, I provide a pair of vertically arranged movable belts 150 which are continuous loops and which pass around shaft 120 at the lower ends and an auxiliary shaft 151 at the upper ends. The shaft 151 is parallel to the shaft 120 and suitably journalled in bearings 152. The belts 150 are provided with aligned cleats 153 which catch the lower edge of a jacket in the channel member 105 and raise it as the belts move. The channel member 105 is suitably cut away to provide for the movement of the belts 150 and cleats 153. Another shaft 154 is provided parallel to the shaft 151 and spaced to the rear thereof in a horizontal plane. This shaft is also suitably mounted in bearing members 155. Belts 156 which are continuous loops are passed around the two shafts 151 and 154 and are caused to move by the rotation of the shaft 151 which is in turn caused to move by the rotation of the shaft 120. The belts 156 are also provided with cleats 157 which are for the purpose of pushing a jacket which falls upon the belts 156. As the jacket is moved upwardly by the movement of belts 150, the upper edge thereof engages a pair of guide members 158 which cause it to lean toward the rear and eventually fall upon the belts 156. The cleats 157 then cause it to move along with the belts 156 to fall over the shaft 154 and be deposited upon a stack of jackets 159 which have already passed through the machine. Suitable guides 160 and 161 may be provided to cause a falling jacket to align itself properly with those already in the stack.

Figure 6:
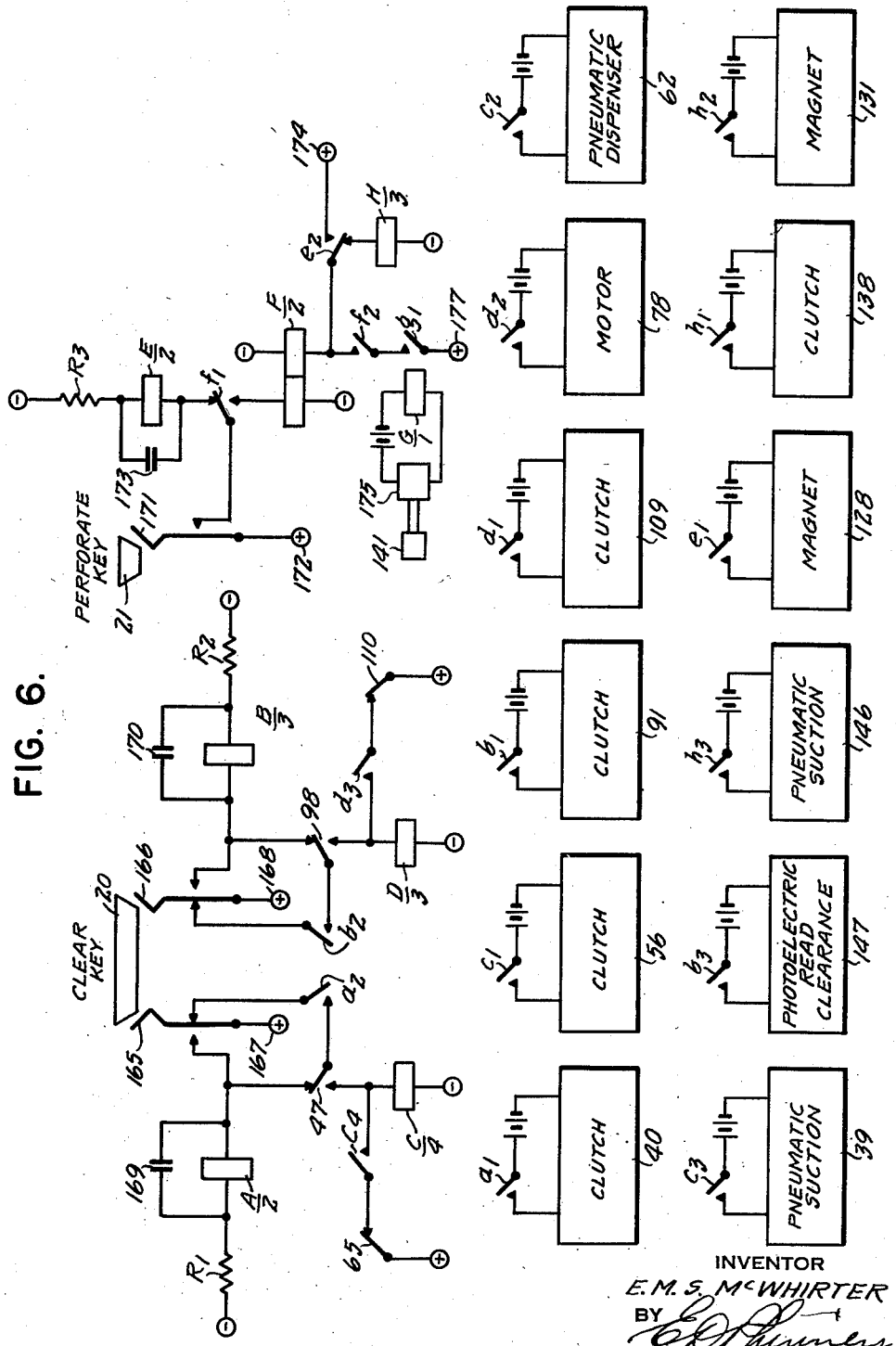
Fig. 6 is a circuit diagram of the electrical control circuit for the machine.

The entire machine is electrically operated under control of the two keys, already referred to, the "clear" key 20 and the "perforate" key 21. The electrical circuit for controlling the machine is shown in Fig. 6 and will now be explained.

The "clear" key 20 has two movable springs 165 and 166 and each is connected to positive battery, indicated, respectively at 167 and 168. The spring 165 has a make contact and break contact, as does also the spring 166. When the key 20 is depressed, positive battery at 167 is connected over the make contact of spring 165, through the winding of a relay A and a resistance R1, to negative battery. The relay A is shunted by a condenser 169 making it slow to release.

The relay A has two make contacts. Contact $a1$ closes a circuit for the clutch 40, as indicated in the lower portion of Fig. 6, which clutch, it will be remembered, controls the operation of the shaft 32 and belts 31, so that the belts 31 start to move towards the front of the machine and cause the removal of one of the jackets 1 from the jacket magazine 27.

The second make contact $a2$ of relay A prepares a locking circuit for the relay from the break contact of spring 165 of the "clear" key 20 to the make contact thereof through break contact of micro-switch 47. The switch 47 is operated at the instant of depressing the key, since the belts 31 are stationary, with one of the cleats 46 in contact with the switch 47. Therefore this locking circuit is opened at the break contact of the switch 47 before the "clear" key 20 is depressed. However, upon the start of the movement of belts 31, one of the cleats 46 will leave the switch 47 and cause it to release, thus closing its break contact and completing the locking circuit for relay A when the "clear" key is released and spring 165 touches its break contact again.

Also, when the "clear" key 20 is depressed, positive potential from the source 168 is applied over the make contact of spring 166, through the winding of relay B and resistance R2, to negative battery, thus causing the operation of relay B. Relay B is shunted by a condenser 170 making it slow to release.

Relay B has three make contacts. Make contact $b1$ closes a circuit for clutch 91 which connects the shaft 88 of holder 83 with the drive mechanism and causes it to rotate in a counterclockwise direction.

Make contact $b2$ prepares a locking circuit for relay B which includes the break contact of micro-switch 98. Micro-switch 98 is shown in its unoperated position. However, before the "clear" key 20 is depressed, this micro-switch will be operated, since the holder 83 is in a stationary position with one of the channel members acting upon the switch. When the holder 83 starts to operate, as it does when clutch 91 operates, micro-switch 98 is released and the locking circuit for relay B is completed over the break contact thereof when the "clear" key is released and positive source 168 is connected to make contact $b2$ over the break contact of spring 166.

Make contact $b3$ closes a circuit for the photoelectric read mechanism 147 to clear whatever has been displayed in the windows 148.

As soon as the belts 31 have moved a distance sufficient to bring the first jacket into the check-inserting position, one of the cleats 46 operates the micro-switch 47. This opens the locking circuit for the relay A at the break contact of the switch and that relay releases. When it does so, it further opens its locking circuit at make contact $a2$, and it opens the circuit for clutch 40 at make contact $a1$. When the clutch 40 releases, shaft 32 stops the belts 31 stop, with one of the cleats 46 in engagement with the switch 47, holding it operated.

The switch 47 operates before make contact $a2$ opens, whereupon positive potential from source 167 is connected through the break contact of spring 165, make contact $a2$, make contact of switch 47, winding of relay C, to negative battery.

Relay C has four make contacts. Make contact $c1$ operates clutch 56 which starts shaft 55 rotating, and also rollers 50 and 57 and the belts 48 through the gears 53, 54 and 58. The rotation of shaft 55 also causes the pinion 54' to move the shaft 51' bodily within its slotted bracket 52', so as to cause the wheel 50' to extend through the slot 8 in the jacket to engage the check as it passes from the rollers 50 and 57.

Make contact $c2$ closes a circuit through the pneumatic dispenser control device 62 which causes the rear-most check in the block of checks to be removed and placed upon the belts 48. Thus, a check is started in the direction of the rollers 50 and 57, urged along by the cleats 49.

Make contact $c3$ closes a circuit which operates the pneumatic tube control mechanism which sucks against the sides of the jacket in the check-inserting position and thus causes the sides 2 and 3 of the jacket to open and provide an ample space for the check to be inserted.

Make contact $c4$ closes a locking circuit for the relay C. During the time that the belts 48 are at rest, one of the cleats 59 is in engagement with micro-switch 65 causing the break contact thereof to be opened, which would normally prevent the closing of the locking circuit through relay C. However, when the belts 48 start to move, the cleat 59 leaves the switch 65, so that it releases, and therefore, when the make contact $c4$ closes, the locking circuit is complete.

When the relay B operates clutch 91, the holder 83 starts to operate in a clockwise direction, as has already been stated. As soon as it leaves its position of rest, switch 98 releases in order to complete the locking circuit for relay B. However, when the holder has turned through 90°, so that another one of the channel members 84 to 87 reaches the switch 98, the switch is operated again, thus closing a circuit for relay D from positive source 168 through break contact of spring 166 of "clear" key 20, make contact $b2$, make contact of switch 98, winding of relay D, to negative battery. At the same time that switch 98 operates it breaks the holding circuit through relay B at its break contact, and this relay releases, releasing clutch 91 and stopping the holder 83.

The relay D has three make contacts. Make contact $d1$ closes a circuit to operate clutch 109 which causes the shaft 107 to operate and the pusher finger 106 to push a jacket which may be in the channel arm of the holder 83 towards the left and into the channel member 105.

Make contact $d2$ closes a circuit for the motor 78 which causes the motor shaft 77 to rotate and the crank arm 76 to push the shaft 67 downwardly, at the same time moving the belts 69 forwardly to tilt any jacket positioned upon the belt, so that it will fall into one of the channel arms of the holder 83, where it will stand in an upright position which represents the first inspection position and where it will be visible through the window 22 provided in the housing.

Make contact $d3$ closes a locking circuit for the relay D. When the pusher finger 106 is at rest, micro-switch 110 is engaged by the cleat 111 and is therefore operated. In this condition the locking circuit for relay D is opened at the break contact of switch 110, but as soon as the pusher finger 106 starts to move, the micro-switch 110 is released which closes the locking circuit for the relay D.

Figure 7:
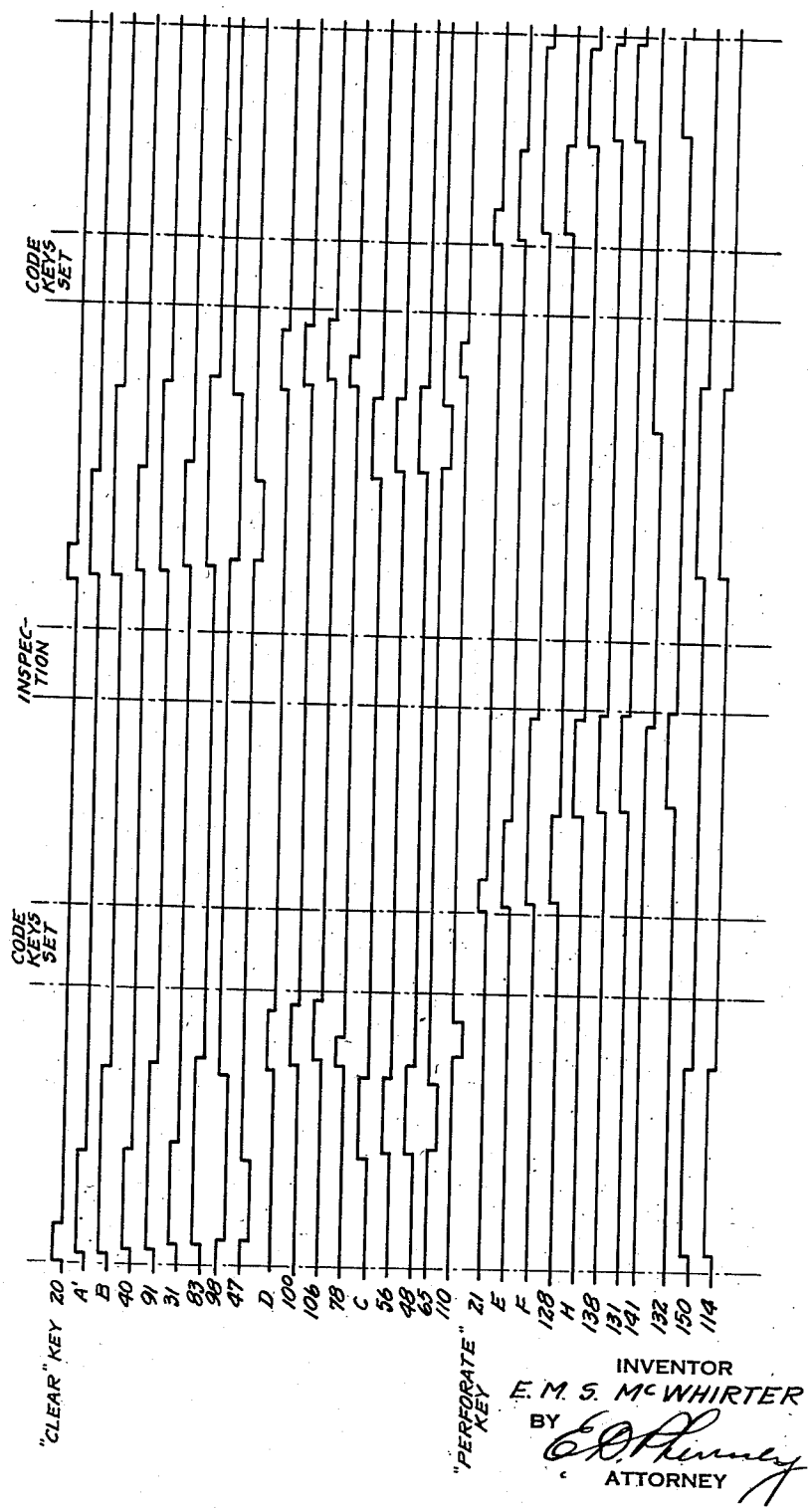
Fig. 7 is a timing chart showing the timing of the operation of the various moving parts of the machine.

In the normal operation of the machine, the operator will first depress the "clear" key 20. Then she will examine the reverse side of a check in the first inspection position. Then she will examine the face of the check in the second inspection position and depress the code keys 19 to set up the coded indicia. Then she will depress the "perforate" key 21 and compare the information which then appears in the windows 148 with the information on the face of the check. If the two agree, she will depress the "clear" key 20 again and the cycle repeats. The time chart shown in Fig. 7 illustrates the timing of all of the important elements of the machine.

When the machine is first started, the operator will depress the "clear" key 20 three separate times before a jacket will appear in the channel member 105 which is the second inspection position. She will then depress the keys for applying the coded indicia to the paper strip, and when these have been depressed, she will press the "perforate" key 21, moving spring 171 which is connected to a source of positive battery, indicated at 172. Upon pressing the "perforate" key 21, the source of potential 171 is connected through the make contact of spring 169, through a break contact f1 of a relay F, the winding of a relay E, resistance R3, to negative battery. The winding of relay E is shunted by a condenser 173 to make it slow in releasing.

The relay E has two make contacts. Make contact e1 closes a circuit for the operation of magnets 128 which control the cutting off of the paper strip 129 and the perforation thereof by the punching mechanism 125.

Make contact e2 closes a circuit for the first winding of a two-winding relay F from a positive source of potential, indicated at 174, through the make contact e2.

Relay F has two make contacts. Make contact f1 closes a circuit through the second winding of the relay F and the make contact of spring 171 of the "perforate" key 21, while that key is still operated.

Contact f2 closes a locking circuit for the relay F, provided the photoelectric cell 141 is not operated; in other words, provided there is paper between the photoelectric cell 141 and its cooperating light source. In order to accomplish this purpose the photoelectric cell 141 is connected to an amplifier 175 which has its output connected in series with a battery 176 across a relay G having one make contact g1 in the locking circuit of relay F. When there is a sheet of paper between the photoelectric cell 141 and its associated light source, the relay G will not be operated and therefore the contact g1 will be opened and there will be no locking circuit for the relay F. If, however, there is no paper between the photoelectric cell 141 and its associated light source the photoelectric cell will operate which will operate the relay G, thus providing a locking circuit for the relay F.

When the relay F operates, it opens the operating circuit for relay E at break contact f1 and this relay releases. At make contact e1 the relay E releases the magnet 128, so that the perforating mechanism and knife edge cutter arrangement are restored to their normal condition. At the same time, the break contact e2 completes a circuit for a relay H from positive potential source 177 through make contact g1, make contact f2, break contact e2, winding of relay H, to negative battery.

Relay H has three make contacts. Make contact h1 closes a circuit for clutch 138 which causes movement of the belt 132 through the gear train including shaft 133, gears 135 and 136, shafts 137 and 137', and gears 139 and 140.

Make contact h2 closes a circuit through magnet 131 which shifts the plate 130 against the paper strip 129, causing the paper strip to be frictionally driven by the belt 132 into the space provided for it in the jacket.

Make contact h3 closes a circuit through the pneumatic tube control 146 to cause the pneumatic tubes 145 to open up the plates 2 and 3 of the particular jacket then in the channel member 105, so that the jacket may receive the paper strip 129.

In the operation of the machine, the first jacket will appear in the first inspection position in front of the window 22 after the operator has depressed the "clear" key 20 the second time. This jacket will be in such a position that the reverse side of the check is visible and the operator can inspect it to see if the proper endorsement is present. After she has depressed the "clear" key 20 the third time, the second jacket will appear in the first inspection window and the first jacket will have rotated 180° on the holder 83 and will appear in the second inspection position in the channel member 105. The rotation of the holder 83 will have reversed the position of the check so that now the operator can inspect the face of the first check in the first jacket. The machine will stop in this position until the operator takes appropriate action, giving her time to operate the encoding keys 19 and the "perforate" key 21. The latter key causes the perforation of the paper strip 129 and the severence of the strip and initiates the insertion of the strip through the jacket. While moving into the jacket the coded information on the strip is read off by the photoelectric read 147 and the information appears in the windows 148, so that the operator may compare what she has applied to the strip with the original information on the face of the check. When the operator is satisfied that the information coded on the paper strip in the jacket is correct, she depresses the "clear" key 20, whereupon the cycle is repeated: the second jacket containing the second check appears in the second inspection window 23, the third jacket containing the third check appears in the first inspection window 22. The operation is repeated until all the checks have been inserted in jackets and the jackets piled up to form the stack 159 at the rear of the machine.

While the invention has been described in connection with punching the coded information upon a paper strip, it will be evident that other means of applying this information may be used, such means being well known in the art. For instance, the information may be embossed upon a strip or the information may be applied magnetically to the strip, in either case the reading being done by well known means. Also the strip for the indicia may be dispensed with and a portion of the jacket provided with a magnetic coating upon which the indicia may be magnetically imprinted.

While I have described above the principles of my invention in connection with specific apparatus, it is to be clearly understood that this description is made only by way of example and not as a limitation to the scope of my invention, as set forth in the objects thereof and in the accompanying claims.

What is claimed is:

1. Apparatus for processing documents comprising a jacket-loading position, means for feeding one jacket at a time to said jacket-loading position, means for feeding and delivering said documents one at a time to said jacket-loading position, means for inserting said document into said jacket at said jacket-loading position, an inspection position for displaying said jacketed document, means for transporting said loaded jacket to said inspection position, means for earmarking said jacket to represent information appearing on said document carried by said jacket and means for removing said loaded jacket from said inspection position.

2. Apparatus for jacketing documents in preparation for automatic processing comprising means for holding a stack of jackets, a jacket-loading position, means for feeding one jacket at a time from said stack of jackets and delivering said jacket to said jacket-loading position, means for holding a batch of documents one of which is to be inserted in each said jacket, means for feeding and delivering said documents one at a time to said jacket-loading position, means for inserting said document into a jacket at said jacket-loading position, an inspection position for displaying said jacketed document, means for transporting said loaded jacket to said inspection position, means for applying coded indicia to said jacket representative of information appearing on said document carried by said jacket, means for reading said coded indicia, means for visually displaying the information as read by said last-mentioned means, and means for removing said jacket from said inspection position.

3. Apparatus for jacketing documents in preparation for automatic processing comprising means for holding a plurality of jackets, a jacket-loading position, means for feeding one jacket at a time from said plurality of jackets and delivering said jacket to said jacket-loading position, means for holding a plurality of documents one of which is to be inserted in each said jacket, switch means for initiating the operation of said jacket feeding means, means for feeding and delivering said documents one at a time to said jacket-loading position, means for inserting said document into a jacket at said jacket-loading position, an inspection position for displaying said jacketed document, means for transporting said loaded jacket to said inspection position, operator controlled means for applying coded indicia to said jacket to represent information appearing on said document carried by said jacket, automatic means for sensing and displaying said coded indicia whereby an operator is able to compare it with the information appearing on said document, and second means controlled by said switch means for removing said loaded jacket from said inspection position.

4. Apparatus for jacketing documents in preparation for automatic processing comprising means for holding a plurality of jackets, a jacket-loading position, means for feeding one jacket at a time from said plurality of jackets and delivering said jacket to said jacket-loading position, means for holding a plurality of documents one of which is to be inserted in each said jacket, means for feeding and delivering said documents one at a time to said jacket-loading position, means for inserting said document into a jacket at said jacket-loading position, an inspection position for displaying said jacketed documents, means for transporting said loaded jacket to said inspection position, means for impressing coded indicia on a strip of sheet material to represent information appearing on said document carried by said jacket, means for inserting said strip into said jacket in said inspection position and manually-controlled means for removing said loaded jacket from said inspection position.

5. Apparatus for jacketing documents in preparation for automatic processing comprising means for holding a plurality of jackets, a jacket-loading position, means for feeding one jacket at a time from said plurality of jackets and delivering said jacket to said jacket-loading position, means for holding a plurality of documents one of which is to be inserted in each said jacket, means for feeding and delivering said documents one at a time to said jacket-loading position, means for inserting said document into a jacket at said jacket-loading position, an inspection position for displaying said jacketed document, means for transporting said loaded jacket to said inspection position, a code punch device, keyboard controlled means for actuating said code punch device to punch coded indicia on a strip of sheet material to represent information appearing on said document carried by said jacket, means to apply said strip to said loaded jacket, and means for removing said loaded jacket from said inspection position.

6. Apparatus for jacketing documents in preparation for automatic processing comprising means for holding a plurality of jackets, a jacket-loading position, means for feeding one jacket at a time from said plurality of jackets and delivering said jacket to said jacket-loading position, means for holding a plurality of documents one of which is to be inserted in each said jacket, means for feeding and delivering said documents one at a time to said jacket-loading position, means for inserting said document into a jacket at said jacket-loading position, an inspection position for displaying said jacketed document, means for transporting said loaded jacket to said inspection position, key-controlled means for applying coded indicia to said jacket to represent information appearing on said document carried by said jacket, sensing means for reading said coded indicia, means for visually displaying the sensed indicia whereby an operator is able to compare it with the information appearing on said document, and operator controlled means for removing said loaded jacket from said inspection position.

7. Apparatus for jacketing documents in preparation for automatic processing comprising means for holding a stack of jackets, a jacket-loading position, means for feeding one jacket at a time from said stack of jackets and delivering said jacket to said jacket-loading position, means for holding a batch of documents one of which is to be inserted in each said jacket, means for feeding and delivering said documents one at a time to said jacket-loading position, means for inserting said document into a jacket at said jacket-loading position, a first inspection position, a second inspection position, means for transporting said loaded jacket to said first inspection position for displaying one side of said document, means for transporting said loaded jacket to said second inspection position for displaying the reverse side of said document and means for removing said jacket from said second inspection position.

8. Apparatus for jacketing documents in preparation for automatic processing comprising means for holding a stack of jackets, a jacket-loading position, means for feeding one jacket at a time from said stack of jackets and delivering said jacket to said jacket-loading position, means for holding a batch of documents one of which is to be inserted in each said jacket, means for feeding and delivering said documents one at a time to said jacket-loading position, means for inserting said document into a jacket at said jacket-loading position, a first inspection position, a second inspection position, means for transporting said loaded jacket to said first inspection position for displaying one side of said document, means for transporting said loaded jacket to said second inspection position for displaying the reverse side of said document, means for applying coded indicia in said second inspection position to said jacket representative of information appearing on said document carried by said jacket, and means for removing said jacket from said second inspection position.

9. Apparatus for jacketing documents in preparation for automatic processing comprising means for holding a stack of jackets, a jacket-loading position, manually operable means for feeding one jacket at a time from said stack of jackets and delivering said jacket to said jacket-loading position, means for holding a batch of documents one of which is to be inserted in each said jacket, automatic means controlled by said jacket feeding means for feeding and delivering said documents one at a time to said jacket-loading position and for inserting said document into said jacket at said jacket-loading position, an inspection position for displaying said jacketed document, means controlled by said manually operable means for transporting said loaded jacket to said inspection position, key-operated means for applying coded indicia to said jacket representative of information appearing on said document carried by said jacket, and means controlled by said manually operable means for transporting said jacket from said inspection position.

10. Apparatus for jacketing documents in preparation for automatic processing comprising means for holding a stack of jackets each comprising front and rear plate members between which a document is adapted to be inserted, a jacket-loading position, means for feeding one jacket at a time from said stack of jackets and delivering said jacket to said jacket-loading position, means for holding a batch of documents one of which is to be inserted in each said jacket, means for feeding and delivering said documents one at a time to said jacket-loading position, means for inserting said document into a jacket at said jacket-loading position, means at said jacket-loading position for separating the front and rear plates of said jacket for facilitating insertion of said document therebetween, an inspection position for displaying said jacketed document, means for transporting said loaded jacket to said inspection position, means for applying coded indicia to said jacket representative of information appearing on said document carried by said jacket, and means for removing said jacket from said inspection position.

11. Apparatus for jacketing documents in preparation for automatic processing comprising means for holding a stack of jackets each comprising front and rear plate members between which a document is adapted to be inserted, a jacket-loading position, means for feeding one jacket at a time from said stack of jackets and delivering said jacket to said jacket-loading position, means for holding a batch of documents one of which is to be inserted in each said jacket, means for feeding and delivering said documents one at a time to said jacket-loading position, means for inserting said document into a jacket at said jacket-loading position, means at said jacket-loading position for separating the front and rear plates of said jacket for facilitating insertion of said document therebetween, an inspection position for displaying said jacketed document, means for transporting said loaded jacket to said inspection position, means for applying coded indicia to a strip of sheet material representative of information appearing on said document carried by said jacket, means for inserting said strip into said jacket in said inspection position, means at said inspection position for separating the front and rear plates of said jacket for facilitating insertion of said strip and means for removing said jacket from said inspection position.

12. Machine for jacketing documents in preparation for automatic processing comprising means for holding a plurality of jackets, a jacket-loading position, means for feeding one jacket at a time from said plurality of jackets and delivering a jacket to said jacket-loading position, means for holding a plurality of documents one of which is to be inserted in each said jacket, means for feeding and delivering said documents one at a time to said jacket-loading position, means for inserting a document into a jacket at said jacket-loading position, an inspection position for displaying a jacketed document, means for transporting a loaded jacket to said inspection position, code application means, a keyboard, means controlled by said keyboard for setting said code application means in accordance with indicia representing information appearing on a document carried by said jacket, a key for initiating operation of said code application means for the application of said indicia to said jacket and a further key for initiating the operation of a jacket feeding and loading cycle in the machine.

13. Apparatus for jacketing documents in preparation for mechanized processing comprising a frame, means on said frame for holding a collection of jackets a jacket-loading position on said frame, means for feeding one jacket at a time from said collection of jackets and delivering said jacket to said jacket-loading position, means on said frame for holding a collection of documents, switch means for initiating the operation of said jacket feeding means, means controlled by said jacket-feeding means for feeding one document at a time from said collection of documents and inserting said document in a jacket at said jacket-loading position, an inspection position on said frame visible from outside said apparatus, first means controlled by said switch means for moving a loaded jacket from said loading position to said inspection position, manually operable key means for applying indicia to said jacket to represent information appearing on the document carried by said jacket, means controlled by said key means for reading said indicia, means controlled by said reading means for displaying the indicia read from said jacket, whereby the information applied to said jacket may be compared with that on said document, a receptacle in said frame for receiving jackets, and second means controlled by said switch means for moving said jacket from said inspection position to said receptacle.

14. Apparatus for jacketing documents, as defined in claim 13, in which the switch means simultaneously initiates the operation of the jacket-feeding means, the operation of the first jacket-moving means, and the operation of the second jacket-moving means, and further comprising individual means, independent of said switch means, for stopping the respective jacket-feeding means and jacket-moving means at predetermined respective times after the initiation thereof.

15. Apparatus for jacketing documents in preparation for mechanized processing comprising means for successively feeding jackets from a collection thereof, manually operable means for initiating the operation of said feeding means, automatic means controlled by said jacket feeding means for successively removing documents from a collection thereof and inserting them into respective jackets, means controlled by said document inserting means for positioning a jacket carrying a document in a first position for inspecting one side of said document, means operated by said manually operable means for shifting said jacket to a second position for inspecting the opposite side of said document, manually operable key means for applying information to a strip of sheet material, means for inserting said strip into a jacket positioned in said second position, means for reading off said information as said strip is inserted into said jacket, whereby the information on said strip may be compared with that on said document, and means controlled by said manually operable means for removing a jacket from said second position.

16. Apparatus for jacketing documents in preparation for mechanized processing comprising a frame, means on said frame for holding a collection of jackets, a jacket-loading position on said frame, means for feeding one jacket at a time from said collection of jackets and delivering said jacket to said jacket-loading position, means on said frame for holding a collection of documents, switch means for initiating the operation of said jacket feeding and delivery means, means controlled by said jacket feeding means for feeding one document at a time from said collection of documents and inserting said document in a jacket positioned at said loading position, a first inspection position in said frame, first jacket moving means controlled by said switch means for moving said loaded jacket from said loading position to said first inspection position with one side of said jacket visible from the front of said apparatus, a second inspection position in said frame, second jacket moving means controlled by said switch means for moving said jacket from said first inspection position to said inspection position and reversing the position of said jacket so that the other side is visible from the front of said apparatus, a supply of sheet material, maually operable key means for applying indicia to a portion of said sheet material to represent information appearing on the document carried by the jacket in said second inspection position and for severing said portion from said supply, means operated by said last-mentioned means for inserting said portion into said jacket, means controlled by said inserting means for automatically reading the indicia on said portion of sheet material as it moves into said jacket, means controlled by said reading means for displaying the indicia read from said portion of sheet material, whereby the information applied to said portion may be compared with that on said document, a receptacle in said frame for receiving jackets, and third jacket moving means controlled by said switch means for moving said jacket from said second inspection position to said receptacle.

17. Apparatus for jacketing documents, as defined in claim 16, in which the switch means simultaneously initiates the operation of the jacket-feeding means, the operation of the first jacket-moving means, and the operation of the second jacket-moving means, and further comprising individual means, independent of said switch means, for stopping the respective jacket-feeding means and jacket-moving means at predetermined respective times after the initiation thereof.

References Cited in the file of this patent

UNITED STATES PATENTS

| 1,803,051 | Boulton | Apr. 28, 1931 |
| 2,305,127 | Albers | Dec. 15, 1942 |